(12) United States Patent
Freitag et al.

(10) Patent No.: US 9,608,254 B1
(45) Date of Patent: Mar. 28, 2017

(54) PULL BAR BATTERY TERMINAL CLAMP

(71) Applicant: Royal Die & Stamping Co., Inc., Carol Stream, IL (US)

(72) Inventors: Erik Freitag, Arlington Heights, IL (US); Wayne Irvin Rohr, Bloomingdale, IL (US)

(73) Assignee: Royal Die & Stamping Co., Inc., Carol Stream, IL (US)

( * ) Notice: Subject to any disclaimer, the term of this patent is extended or adjusted under 35 U.S.C. 154(b) by 0 days.

(21) Appl. No.: 15/165,208

(22) Filed: May 26, 2016

(51) Int. Cl.
*H01R 4/42* (2006.01)
*H01M 2/30* (2006.01)
*H01R 4/44* (2006.01)

(52) U.S. Cl.
CPC .............. *H01M 2/307* (2013.01); *H01R 4/44* (2013.01); *H01M 2220/20* (2013.01)

(58) Field of Classification Search
CPC ... H01R 11/281; H01R 11/283; H01R 11/285; H01R 11/286; H01R 11/289
USPC ......... 439/762, 766, 755, 756, 758; 337/189
See application file for complete search history.

(56) References Cited

U.S. PATENT DOCUMENTS

| | | |
|---|---|---|
| 3,116,100 A | 12/1963 | Hunter |
| 5,088,941 A | 2/1992 | Nolle |
| 5,290,646 A | 3/1994 | Asao et al. |
| 5,302,143 A | 4/1994 | Inoue et al. |
| 5,445,907 A | 8/1995 | Ito et al. |
| 5,454,741 A | 10/1995 | Okada |
| 5,486,434 A | 1/1996 | Aoyama |
| 5,498,178 A | 3/1996 | Tabata |
| 5,547,403 A | 8/1996 | Haberstroh et al. |
| 5,558,544 A | 9/1996 | Okada et al. |
| 5,584,730 A | 12/1996 | Tabata |
| 5,595,511 A | 1/1997 | Okada |
| 5,733,152 A | 3/1998 | Freitag |
| 5,738,552 A * | 4/1998 | Halbach ............... H01R 11/281 439/762 |
| 6,250,973 B1 | 6/2001 | Lowery et al. |
| 6,764,353 B2 | 7/2004 | Freitag |
| 6,817,908 B2 | 11/2004 | Freitag |
| 7,166,001 B2 * | 1/2007 | Detter .................. H01R 11/283 439/762 |
| 7,189,122 B2 | 3/2007 | Freitag |
| 9,093,768 B1 | 7/2015 | Freitag |
| 9,263,810 B2 | 2/2016 | Noh |
| 2006/0135000 A1 * | 6/2006 | Detter .................. H01R 11/283 439/762 |

FOREIGN PATENT DOCUMENTS

| | | |
|---|---|---|
| DE | 19748806 | 5/1999 |
| WO | WO2015/087663 | 6/2015 |

* cited by examiner

*Primary Examiner* — Hae Moon Hyeon
(74) *Attorney, Agent, or Firm* — McDermott Will & Emery LLP

(57) ABSTRACT

A battery terminal clamp, comprising a body portion made of a conductive material and having top and bottom planar elements. The battery terminal clamp includes a first pull bar, and also includes a second pull bar positioned below the first pull bar. A threaded element extends through the upper pull bar and the lower pull bar, and facilitates the movement of the upper and lower pull bar towards and away from each other, so as to close and open the clamp.

10 Claims, 6 Drawing Sheets

PULL BAR BATTERY TERMINAL CLAMP

CROSS-REFERENCE TO RELATED APPLICATIONS

Not applicable.

FEDERALLY SPONSORED RESEARCH OR DEVELOPMENT

Not Applicable.

TECHNICAL FIELD

The invention is directed to a battery terminal clamp of the type used to connect a vehicular battery to the current-consuming components of that vehicle.

BACKGROUND OF THE INVENTION

Safety and engine control systems in modern automobiles and other vehicles are powered by electrical current. Electrical power is generally stored and dispensed to these systems from a storage battery located under the hood or in the trunk of the vehicle. The electrical current is dispensed to these systems via electrical cables and wires that originate at the positive and negative terminal posts of the storage battery.

A battery terminal clamp provides the connection between the cables and the battery terminal posts. Many battery terminal clamp designs are available to vehicle manufacturers. However, these vehicle manufacturers are always seeking improved battery terminal clamp designs.

Because these clamps are typically placed under the hood of the vehicle, they are subjected to road tar, vibration, extreme variations in temperature and ambient humidity, and the deleterious and corrosive effects of rain, snow, and road salt spray.

Battery terminal clamps are typically neither cleaned nor regularly maintained. In fact, they are generally ignored until the vehicle owner is stranded as a result of the failure of the electrical storage battery or its related cable or wire. As a result, the battery terminal clamps must be rugged and reliable, so as to withstand the harsh conditions to which they are subjected.

Preferably, the design of a battery terminal clamp should be simple, with as few parts and as few moving parts, as possible. The design should be corrosion resistant, easy to fabricate and assemble, and relatively inexpensive to manufacture. The design should also have a relatively low profile, so as to fit within the small under-hood confines of modern lightweight automobiles. The design should be rugged, highly conductive, and provide strong and reliable clamping power.

SUMMARY OF THE INVENTION

The invention is a battery terminal clamp. The battery terminal clamp includes a body portion made of a conductive material.

The body portion may include a top planar element and a bottom planar element.

The battery terminal clamp also may include a first upper pull bar substantially contained within the body portion, and a second lower pull bar. In one embodiment of the invention, one or more of these pull bars may be generally horizontally disposed within the body portion.

The second, lower pull bar may be positioned below the upper pull bar. Like the first upper pull bar, the second lower pull bar may be substantially contained within the body portion.

A generally vertically disposed bolt or other threaded element may extend through the top planar element, the upper pull bar, and the lower pull bar. The bolt or threaded element is threadably secured to either the upper pull bar or the lower pull bar. The bolt or threaded element may be rotated in the clockwise or counterclockwise direction. As a result of this threaded securement of the bolt or threaded element to the upper or lower pull bar, the rotation of the bolt enables the upper and lower pull bars to move either towards or away from each other, respectively.

In one embodiment of the battery terminal clamp of the invention, the bolt or threaded element is threadably secured to the lower pull bar.

In one embodiment, the battery terminal clamp of the invention may also include an orifice formed within the bottom planar element. The bolt or threaded element may extend into the orifice formed in the bottom planar element.

In yet another preferred embodiment of the invention, the upper pull bar and lower pull bar may each include a ramp or central, angled portion. These respective angled portions may be substantially spaced apart when the battery terminal clamp is opened. The respective angled portions may be in substantial contact with each other when the battery terminal clamp is closed.

As the battery terminal clamp is being opened and closed through rotation of the bolt or threaded element, the central angled portion of the upper pull bar slides against the central angled portion of the lower pull bar.

As a result of the particular construction of the battery terminal clamp of the invention, as the upper and lower pull bar are moved into engagement with each other, the clamp closes. In contrast, as the upper and lower pull bars move away from each other, the clamp opens.

BRIEF DESCRIPTION OF THE DRAWINGS

To understand the present invention, it will now be described by way of example, with reference to the accompanying drawings in which.

DETAILED DESCRIPTION

Figure 1:
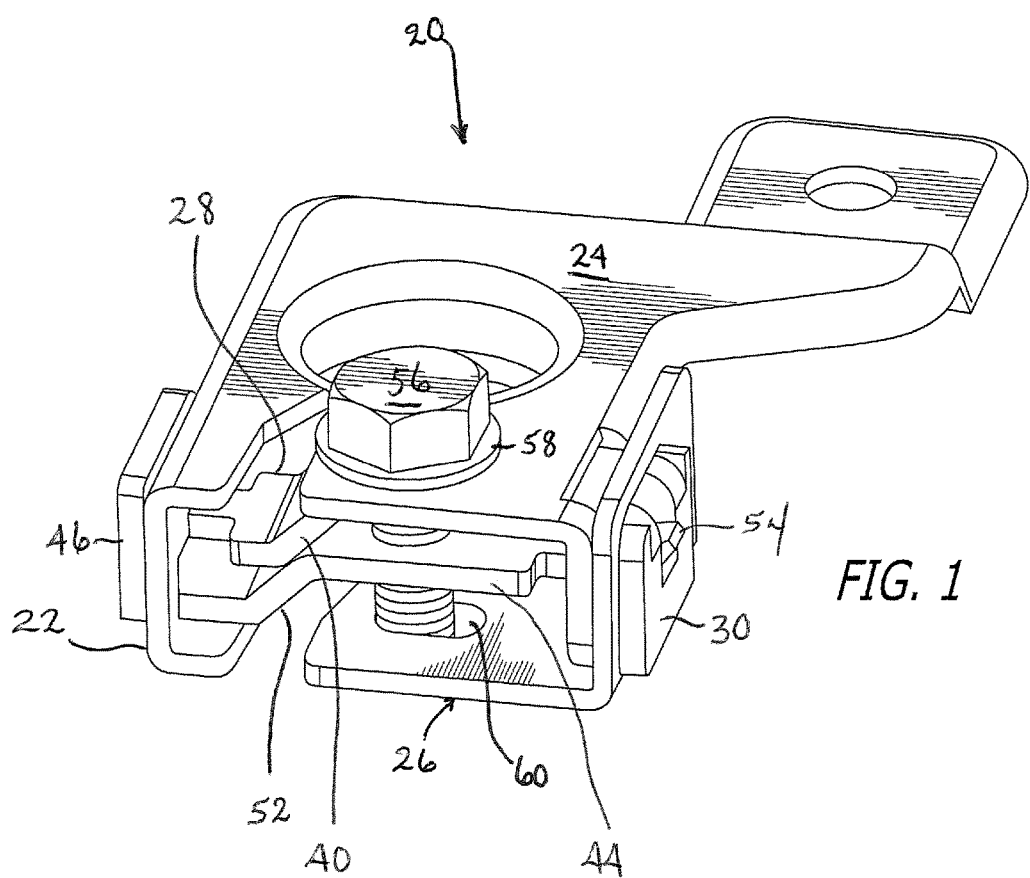
FIG. 1 is a perspective view of a battery terminal clamp in accordance with the invention.

As may be seen in FIGS. 1-12, the invention is a battery terminal clamp 20. The battery terminal clamp 20 includes a body portion 22 made of a conductive material. Here, the body portion 22 is made of copper alloy, and specifically a copper-iron-phosphorus alloy. In this embodiment, the body portion 22 is a one-piece, stamped element. Preferably, the body portion 22 is plated with tin, at a thickness of at least 0.001 inch.

As may best be seen in FIGS. 1, 6, 11 and 12, the body portion 22 includes a top planar element 24 and a bottom planar element 26. When the battery terminal clamp 20 is secured to a storage battery, the top planar element 24 is its upward-facing portion of that clamp 20. In contrast, the bottom planar element 26 contacts and is supported by the top surface of the storage battery case.

The battery terminal clamp 20 also includes a first, upper pull bar 28. This upper pull bar 28 may best be seen in isolation in FIG. 2A. The upper pull bar 28 may best be seen assembled within the body portion 22 of the battery terminal clamp 20 in FIGS. 7-10.

Figure 2A:
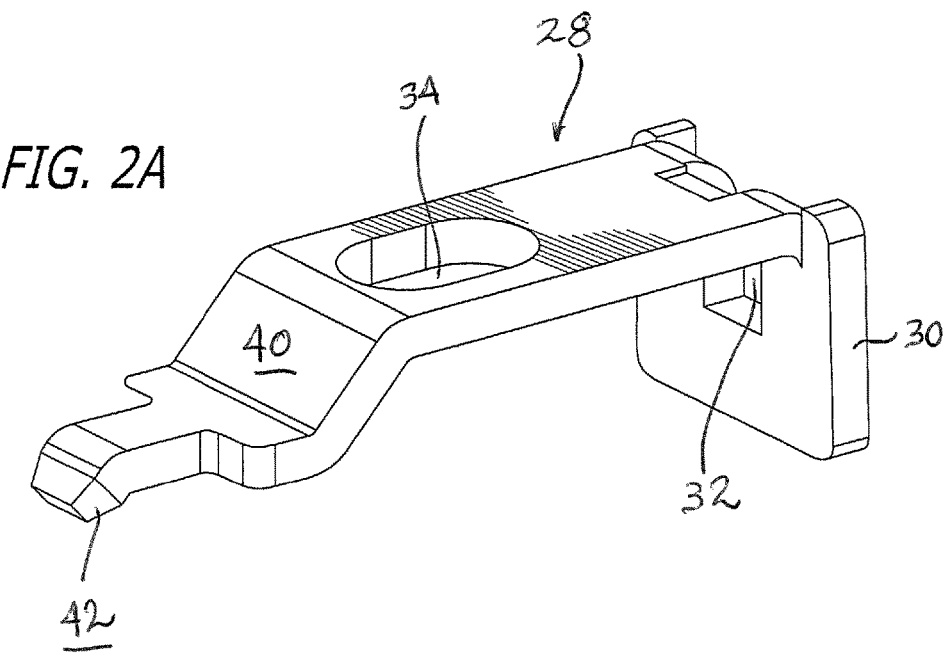
FIG. 2A is a perspective view of a first, generally horizontal upper pull bar, separated from the body portion of the battery terminal clamp in which it is normally contained.

As may be seen in FIG. 2A, the upper pull bar 28 includes an end flange 30 having a slot 32. As may be seen in FIGS. 1 and 7, when the upper pull bar 28 is fully assembled in the battery terminal clamp 20 of the invention, the generally horizontal and elongated portion of the upper pull bar 28 resides within the confines of the body portion 22. In contrast, the substantially vertically disposed end flange 30 is situated outside of the confines of the body portion 22. As may be seen in FIG. 2A, the first upper pull bar also includes an elongated, oval shaped orifice 34.

In this embodiment, as may be seen in FIGS. 7-10, the upper pull bar 28 has a generally horizontal orientation. In other words, as may be seen in FIG. 7, most of the pull bar 28 that is positioned between the left edge 36 of the body portion 22 and the right edge 38 of the body portion 22 is substantially horizontal.

However, a part of the upper pull bar 28, between its opposite ends, comprises a central ramp or angled portion 40. When the upper pull bar 28 is fully and properly positioned within the body portion 22 of the fully assembled battery terminal clamp 20, as shown in FIGS. 7-10, this ramp 40 is not horizontal, but extends downwardly from the upper pull bar 28 at an angle of about 30-50 degrees relative to the horizontal. In the embodiment of FIGS. 7-10, this ramp 40 extends downwardly from the horizontal portion of the upper pull bar 28 at an angle of 45 degrees.

Figure 9:
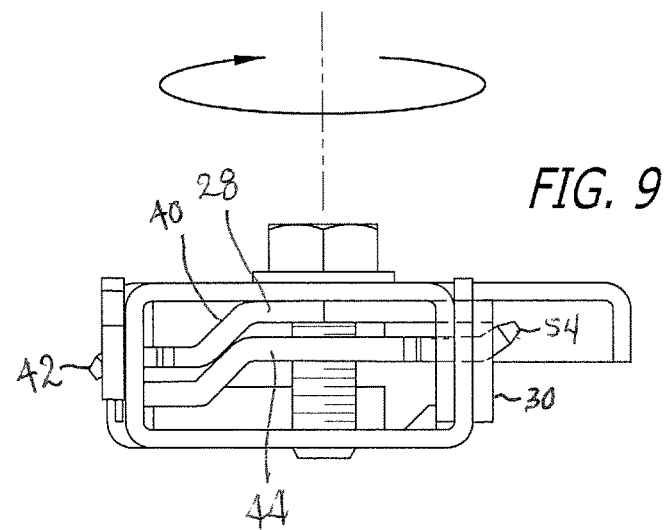
FIG. 9 is another view of the battery terminal clamp of FIG. 8, with the clamp having moved to a more fully closed position.
Figure 10:
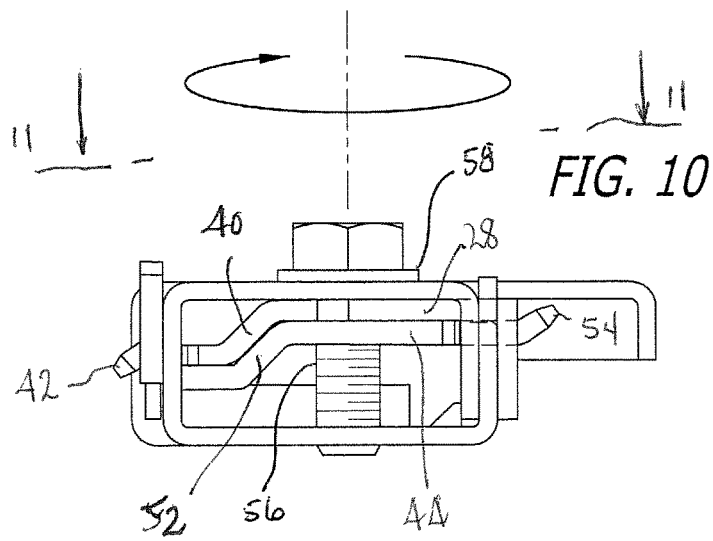
FIG. 10 is another view of the battery terminal clamp of FIGS. 7-9, and now in its fully closed position.
Figure 11:
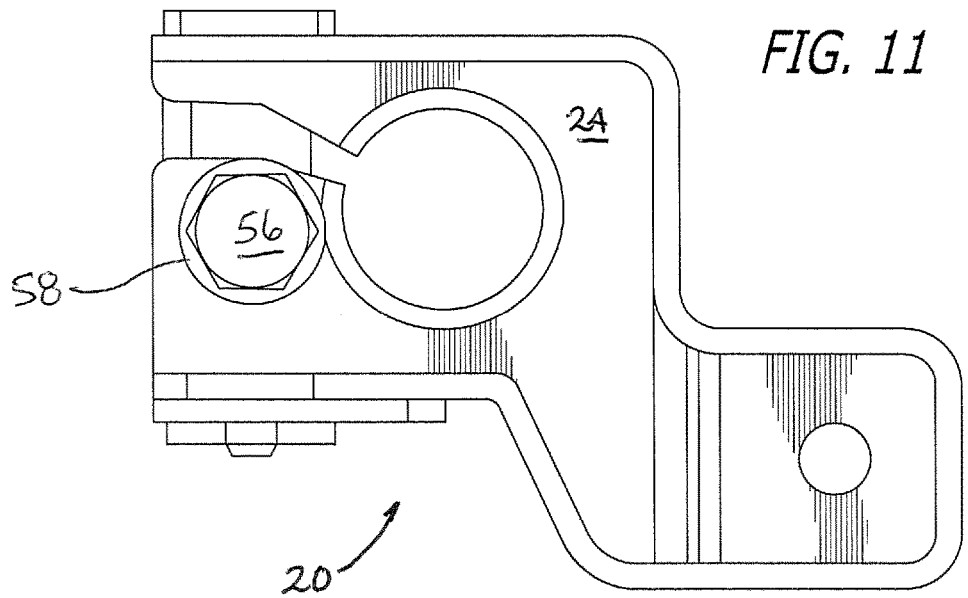
FIG. 11 is a top plan view of the battery terminal clamp of FIG. 10, taken along lines 11-11 of FIG. 10.
Figure 12:
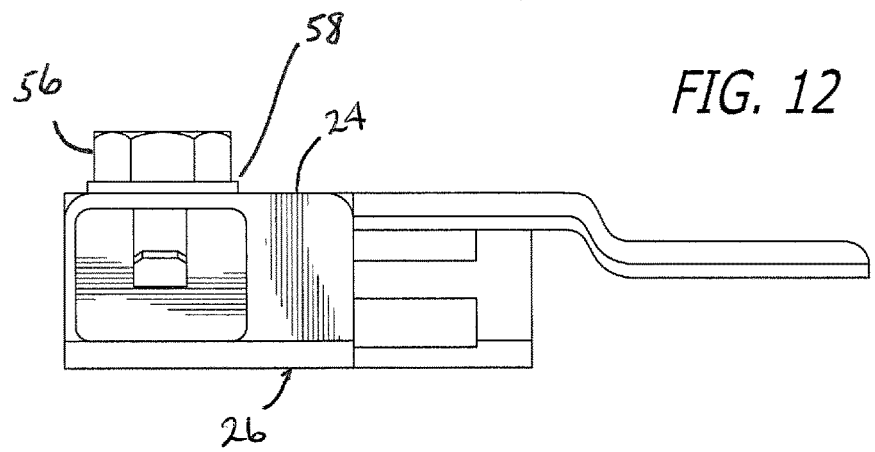
FIG. 12 is a side elevation view of the battery terminal clamp of FIG. 11, taken along lines 12-12 of FIG. 11.

Finally, as may be seen in FIGS. 2A, 9, and 10, upper pull bar 28 includes a tab 42 at its left distal end. This tab 42 is preferably situated at a downward angle relative to the adjacent horizontal portion of the upper pull bar 28. The most preferred angle is approximately 41 degrees.

The battery terminal clamp 20 of the invention also includes a second, lower pull bar 44. The second, lower pull bar works in a complementary manner with the first, upper pull bar 28, and shares many but not all of its features. As but one example of their differences, the second lower pull bar 44 has a preferred thickness of 0.098 inch. In contrast, the upper pull bar 28 has a preferred thickness of 0.078 inch.

Figure 2B:
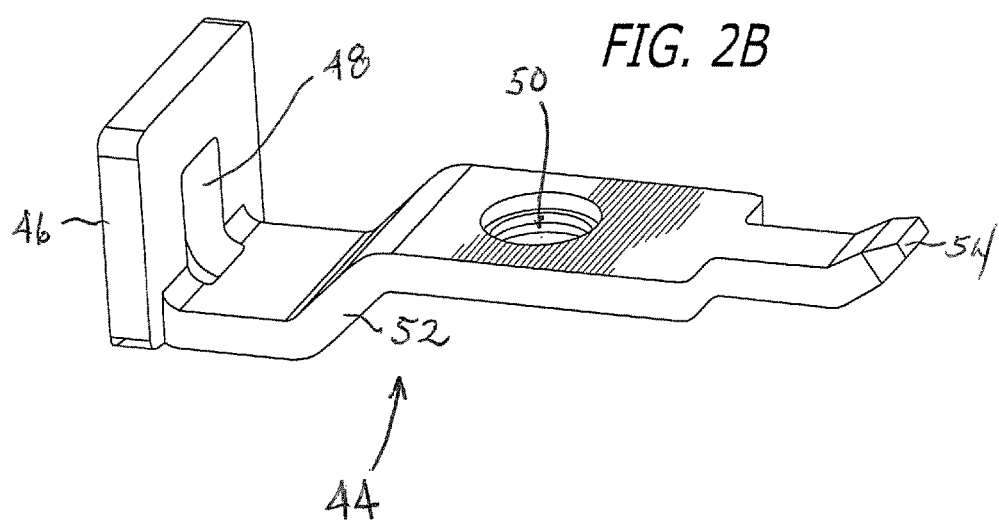
FIG. 2B is a perspective view of a second, generally horizontal lower pull bar, separated from the body portion of the battery terminal clamp in which it is normally contained.

This lower pull bar 44 may best be seen in isolation in FIG. 2B. The lower pull bar 44 may best be seen assembled within the body portion 22 of the battery terminal clamp 20 in FIGS. 7-10, and adjacent and beneath the upper pull bar 28.

As may be seen in FIG. 2B, the lower pull bar 44 includes an end flange 46 having a slot 48.

Figure 7:
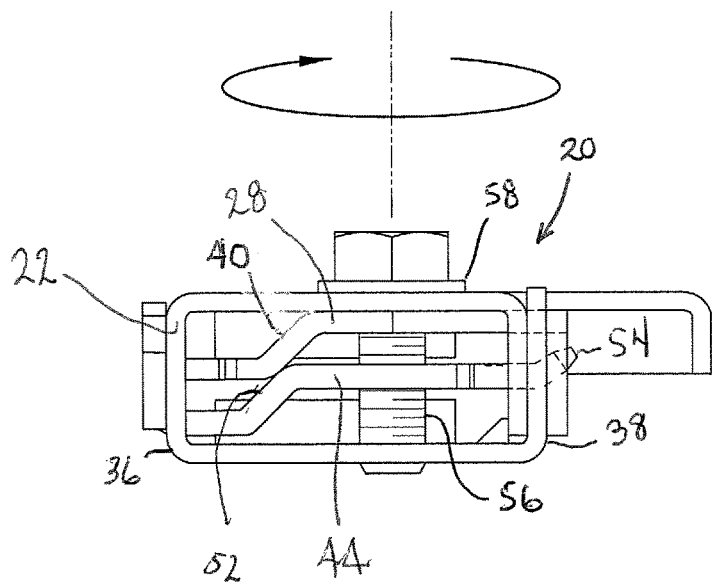
FIG. 7 is a front, side view of the battery terminal clamp of FIG. 1, with the clamp in an open position.

As may be seen in FIGS. 1 and 7, when the lower pull bar 44 is fully assembled in the battery terminal clamp 20 of the invention, the generally horizontal and elongated portion of the lower pull bar 44 resides within the confines of the body portion 22. In contrast, the substantially vertically disposed end flange 46 is situated outside of the confines of the body portion 22. As may be seen in FIG. 2B, the lower pull bar 44 also includes an elongated, generally circular shaped threaded orifice 50.

As with the upper pull bar 28, in this embodiment the lower pull bar 44 has a generally horizontal orientation. In other words, as may best be seen in FIG. 7, most of the pull bar 44 that is positioned between the left edge 36 of the body portion 22 and the right edge 38 of the body portion 22 is substantially horizontal.

However, a part of the lower pull bar 44, between its opposite ends, comprises a central ramp or angled portion 52. When the lower pull bar 44 is fully and properly positioned within the body portion 22 of the fully assembled battery terminal clamp 20, as shown in FIGS. 7-10, this ramp 52 is not horizontal, but extends downwardly from the horizontal portion of the lower pull bar 44 at an angle of about 30-50 degrees relative to the horizontal. In the embodiment of FIGS. 7-10, this ramp 52 extends downwardly from the horizontal portion of the lower pull bar 44 at an angle of 45 degrees.

Finally, as may be seen in FIGS. 1, 2B, and 7-10, lower pull bar 44 includes a tab 54 at its right distal end. This tab 54 is preferably situated at an upward angle relative to the adjacent horizontal portion of the lower pull bar 44. The most preferred angle is approximately 38 degrees.

The upper pull bar 28 is made of an annealed spring steel, and is heat treated to Rc 44±2 using an Austemper process. The lower pull bar 44 is made of a heat treatable steel, and is heat treated to Rc 50±2.

As may best be seen in FIGS. 1 and 7-12, the battery terminal clamp 22 of the invention includes a threaded element, such as a vertically disposed bolt 56. In this embodiment, the bolt 56 is a hex head bolt 56 with a captive washer 58. The washer 58 is captive to the bolt and free-spinning. As will be explained in more detail below, the washer 58 is free-spinning because the hex bolt 56 moves laterally along a slot or orifice 60 in the bottom planar element 26.

In the preferred embodiment, the hex head bolt 56 is made of a heat treatable steel, and is neutral heat treated to a core hardness of Rc 30/36. The captive washer 58 is made of AISI 1008 or 1010 steel, or an equivalent steel.

As may best be seen in FIG. 1, the hex head bolt 56 extends through the top planar element 24, the upper pull bar 28, and the lower pull bar 44. In accordance with the invention, the bolt 56 may be threadably secured to either the upper pull bar 28 or the lower pull bar 44. In this particular embodiment, as may be seen and understood by a comparison of FIGS. 1, 2B, and 7-10, the bolt 56 is threadably secured to the lower pull bar 44, and specifically through threaded orifice 50 of the lower pull bar 44.

FIGS. 3-6 depict the sequentially assembly of the upper pull bar and the lower pull bar into the body 22 of the battery terminal clamp 20. At the end of the assembly sequence, there is a small interference fit between the upper pull bar 28 and the lower pull bar 44. As a result, the upper pull bar 28 and the lower pull bar 44 are retained in place adjacent to each other. This retention eases the insertion of the hex head bolt 56 through the pull bars 28 and 44.

Referring now to FIG. 7, the upper pull bar 28 is spaced relatively far apart from the lower pull bar 44. When the pull bars 28 and 44 are spaced in this manner, the battery terminal clamp 20 of the invention is opened sufficiently to either enable placement of the clamp 20 onto the terminal post of the storage battery; or permit removal of the clamp 20 from the terminal post of the storage battery.

The bolt 56 may be rotated in a clockwise or a counterclockwise direction. In this embodiment, clockwise rotation of the bolt 56 closes the clamp 20, and counterclockwise rotation of the bolt opens the clamp.

Particularly, as discussed earlier, the bolt 56 is threadably secured to the threaded orifice 50 of the lower pull bar 44. Clockwise rotation of the bolt 56 facilitates the movement of the pull bars 28 and 44 towards each other, and progressively closes the clamp 20. This sequence is shown in FIGS. 7-10. In these Figures, the continuous sequential clockwise rotation of the bolt 56 moves the clamp 20 from the fully open position of FIG. 7, to the partially closed position of FIG. 8, to the more fully closed position of FIG. 9, and then to the completely closed or clamped position of FIG. 10. When the clamp 20 is in the position shown in FIG. 10, the clamp 20 may be fully locked onto, and remains securely connected to, the terminal post of the storage battery. As may be seen in FIG. 10, the respective ramps 40 and 52 are in substantial contact with each other when the battery terminal clamp is closed.

Figure 8:
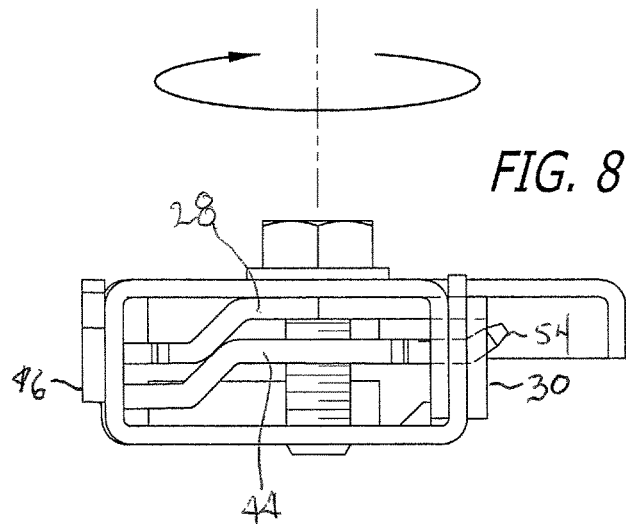
FIG. 8 is another view of the battery terminal clamp of FIG. 7, but with the clamp moving to a partially closed position.

In contrast, beginning with the clamp 20 in the fully closed or clamped position of FIG. 10, the counterclockwise rotation of the bolt 56 causes the pull bars 28 and 44 to move away from each other, i.e, from the fully closed or clamped position of FIG. 10, to the slightly open position of FIG. 9, to the more fully open position of FIG. 8, and then to the fully open position of FIG. 7. When the clamp 20 is in the position shown in FIG. 7, it can be easily removed from the terminal post of the storage battery.

As may be seen in FIG. 1, the battery terminal clamp 20 of the invention may also include a non-threaded orifice 60 formed within the bottom planar element 26. The bolt 56 may extend into and through this orifice 60. This orifice 60 accommodates the movement of the body portion 22, and particularly the movement of the bottom planar element 26, as the battery terminal clamp 20 is being opened and closed in the manner described above and depicted in FIGS. 7-10.

Figure 3:
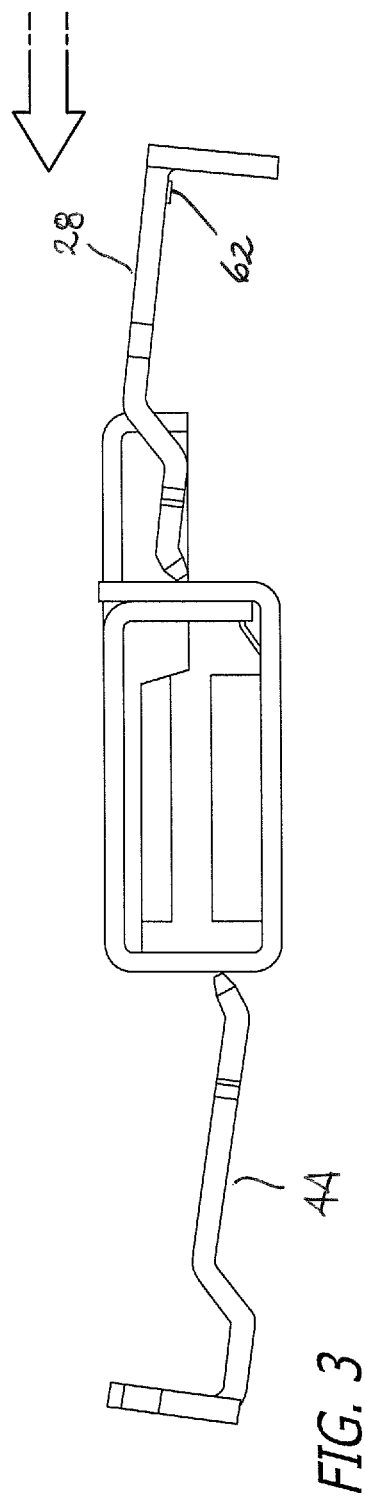
FIG. 3 is a front, side view of a part of the battery terminal clamp of FIG. 1, showing the first upper pull bar and the second lower pull bar positioned outside of the body portion of the clamp, and ready for insertion into the body portion.
Figure 4:
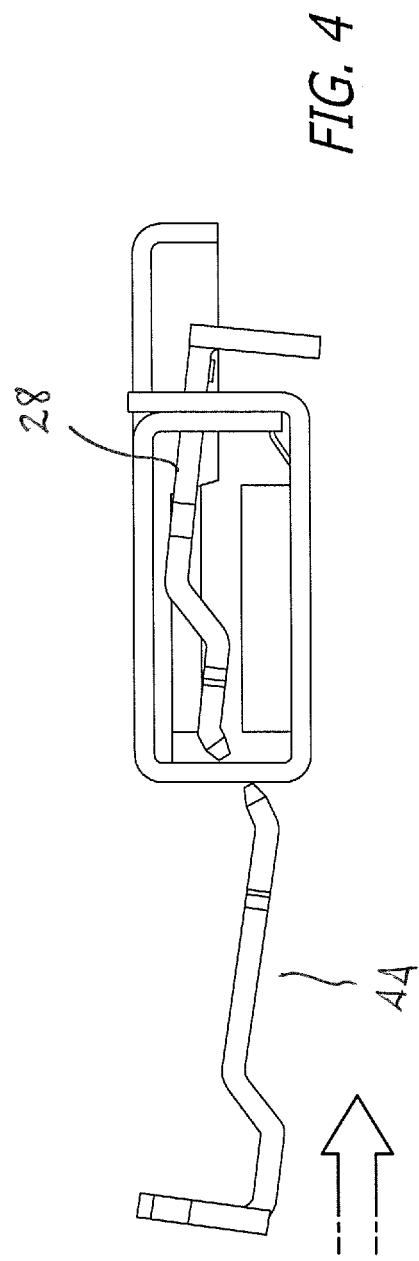
FIG. 4 is a view of the battery terminal clamp of FIG. 3, but showing the first, upper pull bar partially inserted within the body portion.
Figure 5:
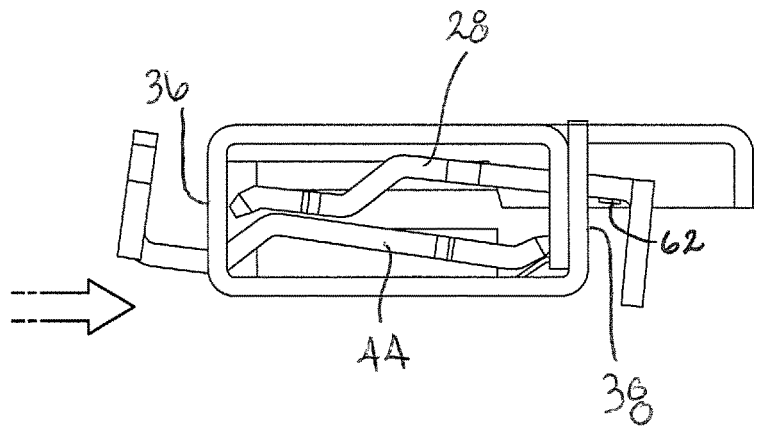
FIG. 5 is a view of the battery terminal clamp of FIG. 4, but showing the second, lower pull bar partially inserted within the body portion.
Figure 6:
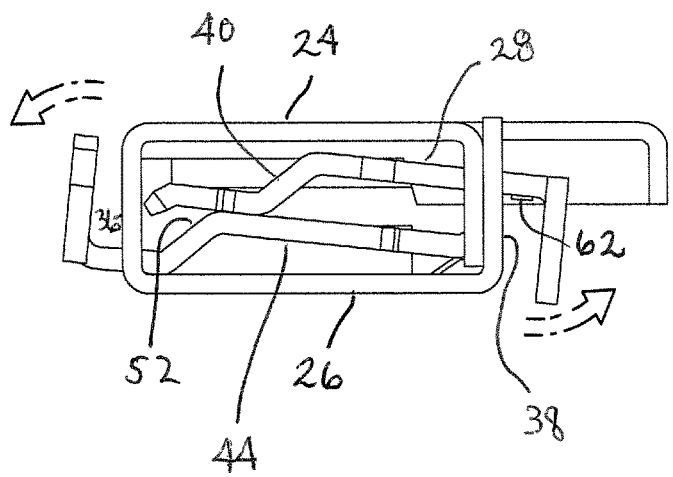
FIG. 6 is a view of the battery terminal clamp of FIG. 5, as the first upper pull bar and second lower pull bar are moving towards full insertion and engagement within the body portion.

As may be seen in FIGS. 3, 5, and 6, the underside of the upper pull bar 28 includes a small, rectangular pad 62. When the upper pull bar 28 is moved into clamping contact with the lower pull bar 44, as shown in FIG. 10, this pad 62 prevents the full engagement of the upper pull bar 28 and lower pull bar 44 in the vicinity of this pad 62. This pad 62 also prevents excessive flexing of the lower pull bar 44 when the clamp 10 is in the fully closed position shown in FIG. 10.

As the upper pull bar 28 and lower pull bar 44 are moved sequentially, through the closing or tightening sequence of FIGS. 7-10, the ramp 40 and ramp 52 increasingly engage and slide against each other. During this tightening sequence, the upper pull bar 28 moves to the right within the body portion 22. In contrast, during this tightening sequence, the lower pull bar 44 remains substantially stationary within the body portion 22.

In addition, during the tightening sequence of FIGS. 7-10, the relative movement of the lower pull bar 44 and the upper pull bar 28 causes end flange 30 to move towards the end flange 46. This action causes the mechanical compression of the body portion 22, and results in the closing of the battery terminal clamp 20.

While this specification describes one or more preferred embodiments, other embodiments are clearly contemplated. The potential embodiments will include all possible forms that are within the scope of the claims.

What is claimed is:

1. A battery terminal clamp, comprising:
   (a) a body portion made of a conductive material, the body portion having a top planar element and a bottom planar element;
   (b) a first, generally horizontal upper pull bar substantially contained within the body portion;
   (c) a second, generally horizontal lower pull bar, positioned below the upper pull bar, and substantially contained within the body portion;
   (d) a generally vertically disposed bolt extending through the top planar element, the upper pull bar, and the lower pull bar, the bolt threadably secured to either the upper pull bar or the lower pull bar, and to thereby effect movement of the upper and lower pull bar towards and away from each other.

2. The battery terminal clamp of claim 1, wherein the bolt is threadably secured to the lower pull bar.

3. The battery terminal clamp of claim 1, wherein the bottom planar element includes an orifice.

4. The battery terminal clamp of claim 3, wherein the bolt extends into the orifice formed in the bottom planar element.

5. The battery terminal clamp of claim 1, wherein the upper pull bar and lower pull bar both include a central, angled portion, their respective angled portions being substantially spaced apart when the battery terminal clamp is opened, and their respective angled portions being in substantial contact with each other when the battery terminal clamp is closed.

6. The battery terminal clamp of claim 1, wherein the upper pull bar and lower pull bar both include a central, angled portion, and wherein the central angled portion of the upper pull bar is slidably movable along the central angled portion of the lower pull bar as the battery terminal clamp is being opened and closed.

7. A battery terminal clamp, comprising:
   (a) a body portion made of a conductive material;
   (b) a first, upper pull bar substantially contained within the body portion;
   (c) a second lower pull bar, positioned below the upper pull bar, and substantially contained within the body portion;
   (d) a threaded element extending through the upper pull bar and the lower pull bar, the threaded element threadably secured to either the upper pull bar or the lower pull bar, to thereby facilitate movement of the upper and lower pull bar towards and away from each other.

8. The battery terminal clamp of claim 7, wherein the threaded element is threadably secured to the lower pull bar.

9. The battery terminal clamp of claim 7, wherein the upper pull bar and lower pull bar both include a pair of complementary angled portions that are substantially coplanar with each other, the respective angled portions being substantially spaced apart when the battery terminal clamp is opened, and the respective angled portions being in substantial contact with each other when the battery terminal clamp is closed.

10. The battery terminal clamp of claim 9, wherein the angled portion of the upper pull bar is slidably movable along the angled portion of the lower pull bar as the battery terminal clamp is being opened and closed.

* * * * *